(12) United States Patent
Weigel et al.

(10) Patent No.: US 11,797,552 B2
(45) Date of Patent: Oct. 24, 2023

(54) SYSTEM AND METHOD FOR SELECTIVE RETRIEVAL OF METADATA ARTEFACT VERSIONS

(71) Applicant: SAP SE, Walldorf (DE)

(72) Inventors: Rick Weigel, Rheinsttten (DE); Markus Viol, Walldorf (DE); Eugen Resch, Rauenberg (DE); Rashmi Nagendra, Malsch (DE); Aditya Bhatia, Schwetzingen (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/492,209

(22) Filed: Oct. 1, 2021

(65) Prior Publication Data

US 2023/0104441 A1     Apr. 6, 2023

(51) Int. Cl.
| | | |
|---|---|---|
| *G06F 7/00* | (2006.01) | |
| *G06F 16/2458* | (2019.01) | |
| *G06F 16/25* | (2019.01) | |
| *G06F 16/21* | (2019.01) | |

(52) U.S. Cl.
CPC ........ *G06F 16/2474* (2019.01); *G06F 16/219* (2019.01); *G06F 16/256* (2019.01)

(58) Field of Classification Search
CPC ... G06F 16/2474; G06F 16/219; G06F 16/256
See application file for complete search history.

(56) References Cited

U.S. PATENT DOCUMENTS

| | | | | |
|---|---|---|---|---|
| 6,697,808 B1 * | 2/2004 | Hurwood | ............. | G06F 16/907 |
| 7,266,565 B2 * | 9/2007 | Diab | ......................... | G06F 8/24 |
| | | | | 707/999.102 |
| 9,171,096 B2 * | 10/2015 | Palanisamy | ........... | G06F 16/972 |
| 9,355,060 B1 * | 5/2016 | Barber | ................ | H04L 67/1097 |
| 9,813,450 B1 * | 11/2017 | Wasiq | ..................... | H04L 63/20 |
| 2002/0065673 A1 * | 5/2002 | Rooke | .................... | G06Q 99/00 |
| | | | | 705/7.39 |
| 2005/0223034 A1 * | 10/2005 | Kaneko | ................ | H04N 21/435 |
| | | | | 375/E7.005 |
| 2007/0156726 A1 * | 7/2007 | Levy | .................... | H04N 21/252 |
| 2007/0226196 A1 | 9/2007 | Adya et al. | | |

(Continued)

OTHER PUBLICATIONS

European Search Report received in European Application No. 22196519.7, dated Feb. 3, 2023, 8 pages.

(Continued)

*Primary Examiner* — Mohammed R Uddin

(74) *Attorney, Agent, or Firm* — Klarquist Sparkman, LLP

(57) ABSTRACT

Techniques and solutions are described for retrieving metadata artefacts from a repository that includes multiple instances of a metadata artefact. The instances can have at least some different content. Metadata artefacts are associated with metadata describing group, searching, or selection criteria, such as one or more of a particular solution, tenant, layer, or version. A request for a metadata artefact can include at least one value for one or more of the criteria, which in turn can be used to identify one or more relevant metadata artefacts. Identifiers for, or content of, relevant metadata artefacts can be returned in response to the request. Fallback logic can be used to determine at least in part what metadata artefacts are relevant to a request, or how to return or process request results.

20 Claims, 12 Drawing Sheets

(56) References Cited

U.S. PATENT DOCUMENTS

| | | | |
|---|---|---|---|
| 2008/0147421 A1 | 6/2008 | Buchmann et al. | |
| 2010/0145984 A1* | 6/2010 | Palaniappan | G06F 16/26 707/769 |
| 2011/0225133 A1* | 9/2011 | Manu | G06F 16/907 707/723 |
| 2015/0025925 A1* | 1/2015 | Moore | G06Q 10/063 705/7.11 |
| 2015/0074643 A1* | 3/2015 | Crossley | G06F 8/36 717/122 |
| 2015/0199367 A1* | 7/2015 | Hammer | G06F 16/1748 707/654 |
| 2015/0205823 A1* | 7/2015 | Rundle | G06F 16/219 707/695 |
| 2015/0205831 A1* | 7/2015 | Rundle | G06F 16/24 707/695 |
| 2015/0278314 A1 | 10/2015 | Fuglsang et al. | |
| 2017/0097832 A1 | 4/2017 | Radhakrishnan et al. | |
| 2019/0207967 A1* | 7/2019 | Vashisht | H04L 63/1425 |
| 2019/0273796 A1* | 9/2019 | Allgeier | H04L 67/561 |
| 2019/0303509 A1 | 10/2019 | Greene | |
| 2020/0192892 A1 | 6/2020 | Portisch et al. | |
| 2020/0334272 A1* | 10/2020 | Hrastnik | G06F 16/2282 |
| 2021/0056100 A1* | 2/2021 | Steinhauser | G06F 8/36 |
| 2021/0316451 A1* | 10/2021 | Kumar | B25J 9/103 |
| 2022/0207061 A1 | 6/2022 | Failer et al. | |
| 2022/0391541 A1* | 12/2022 | Novotny | G06F 21/57 |
| 2022/0391639 A1* | 12/2022 | Gurumurthy | G06K 9/6215 |
| 2022/0398232 A1* | 12/2022 | Sunder | G06F 16/27 |
| 2023/0091845 A1 | 3/2023 | Buchmann et al. | |

OTHER PUBLICATIONS

Non-Final OA received in U.S. Appl. No. 17/482,250, filed Dec. 21, 2022, 50 pages.

Final Office Action received in U.S. Appl. No. 17/482,250, dated Jun. 22, 2023, 63 pages.

* cited by examiner

| ID | Object_Name | Solution | Tenant | Layer | Version |
|---|---|---|---|---|---|
| | 410a | 410b | 410c | 410d | 410e |
| 1 | Employee | ByDesign | 1234 | PARTNER | 1.0 |
| 2 | Employee | ByDesign | 1234 | KEY USER | 1.1 |
| 3 | Employee | ByDesign | - | SAP | 1.0 |
| 4 | Employee | ByDesign | 1235 | PARTNER | 1.0 |
| 5 | Employee | S4 | 1234 | PARTNER | 1.0 |
| 6 | Employee | CBC | 1236 | END USER | 1.3 |
| 7 | Employee | ByDesign | 1234 | END USER | 1.0 |

400

450a 1. WHERE Object_Name = "Employee";
   Result: 1, 2, 3, 4, 5, 6
450b 2. WHERE Object_Name = "Employee" AND solution = "By Design";
   Result: 1, 2, 3, 4, 7
450c 3. WHERE Object_Name = "Employee" AND Solution = "By Design" AND Tenant = "1234";
   Result: 1, 2, 7
450d 4. WHERE Object_Name = "Employee" AND Solution = "By Design" AND TENANT = "1234" AND Release = "1.0";
   Result: 1, 4
450e 5. WHERE Object_Name = "Employee" AND "Solution "By Design" AND Tenant = "1234" AND Release = "1.0" and Layer = "Partner;
   Result: 1

FIG. 4

SYSTEM AND METHOD FOR SELECTIVE RETRIEVAL OF METADATA ARTEFACT VERSIONS

FIELD

The present disclosure generally relates to techniques for retrieving a metadata artefact identifier or content of a metadata artefact from a repository. Particular implementations facilitate retrieval of an identifier of, or content for, one or more versions of the metadata artefact that are indicated by request criteria, as opposed to identifiers of, or content for, other versions of the metadata artefact that are not indicated by the request criteria.

BACKGROUND

Ever increasing amounts of data are becoming available, from an increasing variety of sources. Data associated with a specific purpose, such as a specific analog-world entity, is typically associated with metadata that describes that data. For example, a ten-digit integer might be data, but without metadata, it may be difficult to know what that ten-digit integer represents—a phone number, a driver's license number, a password, etc. Thus, using and making "sense" of data can be highly dependent on having the correct metadata to provide context to the data.

Metadata can also be used to describe software objects. For example, metadata can describe the nature and relationship of data elements of an abstract or composite data type. These metadata objects, or artefacts, may be common to multiple entities, such as clients, tenants in a multitenant database system, end users, etc. (all of which, for ease of presentation will be referred to generally as clients). While some clients may use identical instances or versions of a metadata artefact, other clients may use different versions. Different versions of a metadata artefact can be versions that share the same name or purpose, but which are either independent or are related but have at least some different content.

It can be useful to incorporate metadata into a central repository. However, maintaining multiple versions of metadata artefacts, such as from different clients, in a single repository can create issues with providing access to metadata artefacts only to appropriate clients, and returning a correct metadata artefact to a client upon request. Accordingly, room for improvement exists in the design and operation of metadata repositories.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for retrieving metadata artefacts from a repository that includes multiple instances of a metadata artefact. The instances can have at least some different content. Metadata artefacts are associated with metadata describing group, searching, or selection criteria, such as one or more of a particular solution, tenant, layer, or version. A request for a metadata artefact can include at least one value for one or more of the criteria, which in turn can be used to identify one or more relevant metadata artefacts. Identifiers for, or content of, relevant metadata artefacts can be returned in response to the request. Fallback logic can be used to determine at least in part what metadata artefacts are relevant to a request, or how to return or process request results.

In one aspect, the present disclosure provides a method for retrieving one or more metadata artefacts from a metadata repository. A first instance of a first metadata artefact to be stored in a metadata repository is received. A first unique identifier is assigned to the first instance of the first metadata artefact. The first unique identifier is stored in a first database table.

A second instance of the first metadata artefact to be stored in the metadata repository is received. The second instance of the first metadata artefact includes at least some content that differs from content of the first instance of the first metadata artefact. A second unique identifier is assigned to the second instance of the first metadata artefact. The second unique identifier is stored in the first database table.

A request for a metadata artefact is received, where the request includes request criteria that include a first identifier of a first solution. It is determined, based at least in part on the request criteria, that the first instance of the first metadata artefact and not the second instance of the first metadata artefact satisfies the request. Contents of the first metadata artefact or an identifier of the first instance of the first metadata artefact is returned in response to the request.

In another aspect, the present disclosure provides a method for retrieving one or more metadata objects from a metadata repository, where fallback logic can be applied. A request for a metadata artefact is received. The request includes request criteria. Fallback logic is retrieved, where the fallback logic specifies: (1) information useable to determine a version of a metadata artefact to return in response to the request if no version of a metadata artefact is directly indicated by the request criteria; (2) information useable to determine a version of a metadata artefact to return in response to the request if no version of a metadata artefact directly satisfies the request criteria; or (3) information useable to determine additional versions of a metadata artefact to return in response to a request in addition to a version of the metadata artefact directly indicated by the request criteria. The fallback logic is applied to retrieve at least one metadata artefact version. Contents of the at least one metadata artefact, or an identifier of the at least one metadata artefact version, are returned in response to the request.

The present disclosure also includes computing systems and tangible, non-transitory computer readable storage media configured to carry out, or including instructions for carrying out, an above-described method (or operations). As described herein, a variety of other features and advantages can be incorporated into the technologies as desired.

BRIEF DESCRIPTION OF THE DRAWINGS

FIG. 4 is a diagram illustrating how a repository having metadata describing metadata artefacts can be queried to identify relevant metadata artefacts.

DETAILED DESCRIPTION

Example 1—Overview

Figure 1:
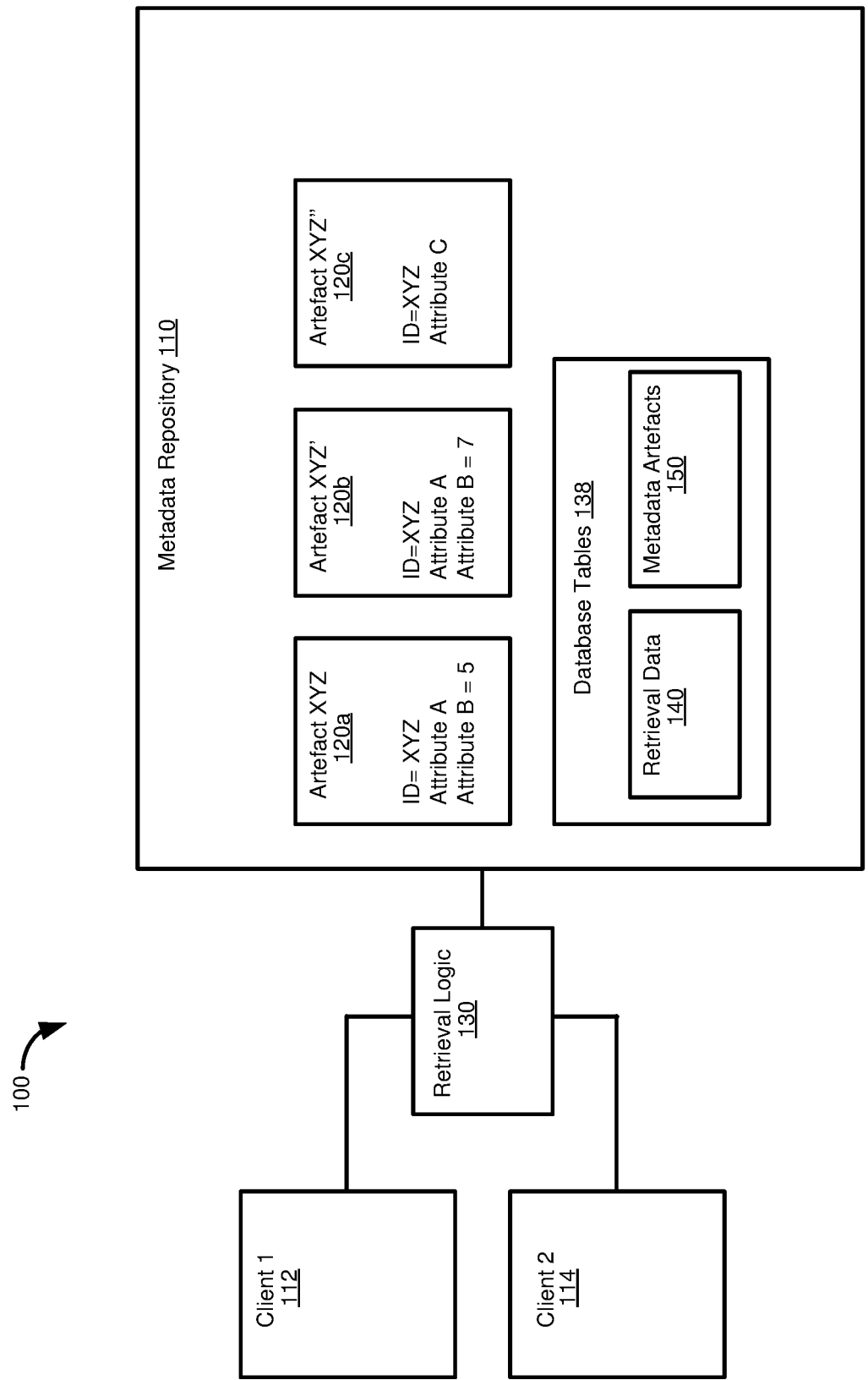
FIG. 1 is a diagram illustrating an example computing environment in which disclosed techniques can be implemented, where multiple clients can retrieve metadata artefacts from a metadata repository.

Ever increasing amounts of data are becoming available, from an increasing variety of sources. Data associated with a specific purpose, such as a specific analog-world entity, is typically associated with metadata that describes that data. For example, a ten-digit integer might be data, but without metadata, it may be difficult to know what that ten-digit integer represents—a phone number, a driver's license number, a password, etc. Thus, using and making "sense" of data can be highly dependent on having the correct metadata to provide context to the data.

Metadata can also be used to describe software objects. For example, metadata can describe the nature and relationship of data elements of an abstract or composite data type. These metadata objects, or artefacts, may be common to multiple entities, such as clients, tenants in a multitenant database system, end users, etc. (all of which, for ease of presentation will be referred to generally as clients). While some clients may use identical instances or versions of a metadata artefact, other clients may use different versions. Different versions of a metadata artefact can be versions that share the same name or purpose, but which are either independent or are related but have at least some different content.

It can be useful to incorporate metadata into a central repository. However, maintaining metadata artefacts, such as from different clients, in a single repository can create issues with providing access to metadata artefacts only to appropriate clients, and returning a correct metadata artefact to a client upon request. Accordingly, room for improvement exists in the design and operation of metadata repositories.

As used herein, "metadata" refers to any information maintained in a computing system that is not executable code, including definitions of data types (e.g., abstract or composite data types) or similar software objects (for example, user interface definitions). Metadata can be expressed in a number of ways, including notations such as JSON or CSN (core schema notation, as used in software available from SAP SE, of Walldorf, Germany), or other text-based formats, such as XML or CSV (comma separated values). However, unless otherwise inconsistent with the present disclosure, metadata can be expressed in other ways, including in file-based formats, generally.

Metadata artefacts can themselves be described by metadata, where the metadata can be used, for example, to select between different versions of a metadata artefact. For example, some versions of a metadata artefact can be associated with a first software application while other versions of a metadata artefact can be associated with a second software application. Similarly, different versions of a metadata artefact can be used by different tenants in a multitenant database system.

As another example, there may be multiple versions of a metadata artefact for different types of entities or users—such as having a base metadata artefact, a metadata artefact as modified by another organization, a metadata artefact modified by a key user, or a metadata artefact modified by an end user. In some cases, modified metadata artefacts are stored as independent metadata artefacts. That is, any given metadata artefact is complete, even if it represents a modification of another metadata artefact. In other cases, only metadata artefact modifications are stored in modified metadata artefacts when a metadata artefact is modified, and a complete version of a modified metadata artefact can be constructed by combining metadata artefacts with modifications with any metadata artefacts it is derived from, including any "base" (original definition of) metadata artefact.

Rules can determine which versions of a metadata artefact take priority over others. Modifications by different users or entities can be one way of categorizing different versions of metadata artefacts, while versioning information is another. Take for example a program that has two different releases forming different code bases, each both having a most recent update. It may not be the case that a release preceding the introduction of version 2, update 0 is that last update of version 1 (e.g., the most recent version of the next earlier code base). Say the last version of a code base for version 1 is update 3, but that version 2 was created based on update 2 of version 1. In this case, update 2 of version 1 is the predecessor of version 2, update 0.

In some cases, precedence rules can be fixed, and in other cases they can change over time. Some precedence rules can be applied to all metadata artefacts, at least by default, while in other cases precedence rules can be specific to specific metadata artefacts.

Multiple versions of a metadata artefact may be stored in a common repository. Since different clients may use different versions of a metadata artefact, it can be important to ensure that a client is sent the appropriate metadata version. For example, a client using a particular software application (or solution) may not be able to use a metadata artefact associated with a different software application. Similarly, one tenant may be using a specialized version of a metadata artefact, while another tenant may use a general version of the metadata artefact.

Disclosed technologies provide techniques for storing, categorizing, and retrieving metadata artefacts. A common ancestor metadata artefact can be identified, and identifiers provided for different variants of the metadata artefact. Variants of a metadata artefact can be associated with different metadata, such as metadata describing a solution (e.g., an application or application suite), a module (a particular component of a solution), a tenant (or specifying that a version is not tenant-specific), a layer (a particular entity or user associated with a given version of a metadata artefact), or a version of the metadata artefact (or a version of a solution or module associated with a metadata artefact). This metadata can be used as selection criteria.

In some cases, multiple versions of a metadata artefact may be relevant to a request. Or, it may be that criteria included in a request for a metadata artefact are not sufficient to identify responsive metadata artefacts. Fallback information can be used to supplement criteria provided in a request for a metadata artefact. In some cases, fallback information can be used to determine multiple versions of a metadata artefact that are responsive to a request and how those versions should be applied in responding to a request (e.g., whether content in one version will overwrite content in another). Fallback information can also be used when a request is ambiguous, such as failing to specify a layer or version when metadata artefacts are available at multiple layers/versions. Or, fallback information can be used when a request does not match stored metadata artefacts, such as a user specifying a first layer in a request but where metadata artefacts exist that are not assigned to layers or are assigned to layers other than that specified in the request.

Some fallback information can be fixed, such as a having a fixed order used to select between layers. Other fallback information can have a variable order, such as having different layer orderings for different metadata artefacts, or being able to alter an ordering for a particular metadata artefact. Fallback information can be provided by set rules, or can be determined for specific metadata objects, including determining version information or layer information for specific metadata artefacts.

Thus, disclosed techniques can facilitate storing multiple versions of metadata artefacts in a central repository, including in a manner such that data separation can be maintained. For example, associating metadata artefacts with tenant identifiers can help ensure that metadata artefacts associated with one tenant are not provided to another tenant.

Example 2—Example Computing Environment

FIG. 1 illustrates an example computing environment 100 in which disclosed technologies can be implemented. The computing environment 100 includes a metadata repository 110 that can be accessed by a plurality of clients 112, 114. As explained in Example 1, different metadata in the metadata repository 110 may be relevant to different clients 112, 114, or even in response to different requests from the same client (e.g., depending on a particular software application associated with a given client request).

The metadata repository 110 stores definitions of metadata artefacts, such as the three versions 120*a*, 120*b*, 120*c* of a metadata artefact XYZ. It can be seen that the elements (either the presence or absence of various elements, or one or more values associated with a given element) differ between the metadata artefact versions 120*a*-120*c*.

Retrieval logic 130 can be used to determine what metadata artefact (for example, providing identifiers for any relevant metadata artefacts identified, or providing contents of such artefacts) should be returned to a client 112, 114 in response to a client request. In some cases, the retrieval logic 130 simply processes queries from the client 112, 114. In other cases, the retrieval logic 130 can modify or add to parameters in a client request to locate artefacts, or can process results prior to providing a final result back to a client 112, 114. For example, if multiple artefacts are returned in response to particular search/selection criteria, the retrieval logic 130 can determine whether one or more artefacts should be returned to the client 112, 114, or if multiple artefacts should be combined and a combined artefact provided to the client. In some cases, if a client's query does not lead to any search results, the retrieval logic 130 can modify the search parameters, such as by altering search parameters to increase the scope of a search.

The logic 130 can use retrieval data 140, which can be present in database tables 138, which are shown as part of the metadata repository 110 but in other cases can be included in a different component of the computing environment 100 (e.g., in a database system that is in communication with the metadata repository). Metadata artefacts 150, such as artefacts 120*a*-120*c*, can also be located in database tables 138, at least in some embodiments. The retrieval data 140 can be processed by the retrieval logic 130 (or a component in communication with the retrieval logic) to identify any artefacts that are relevant to search criteria.

Figure 2:
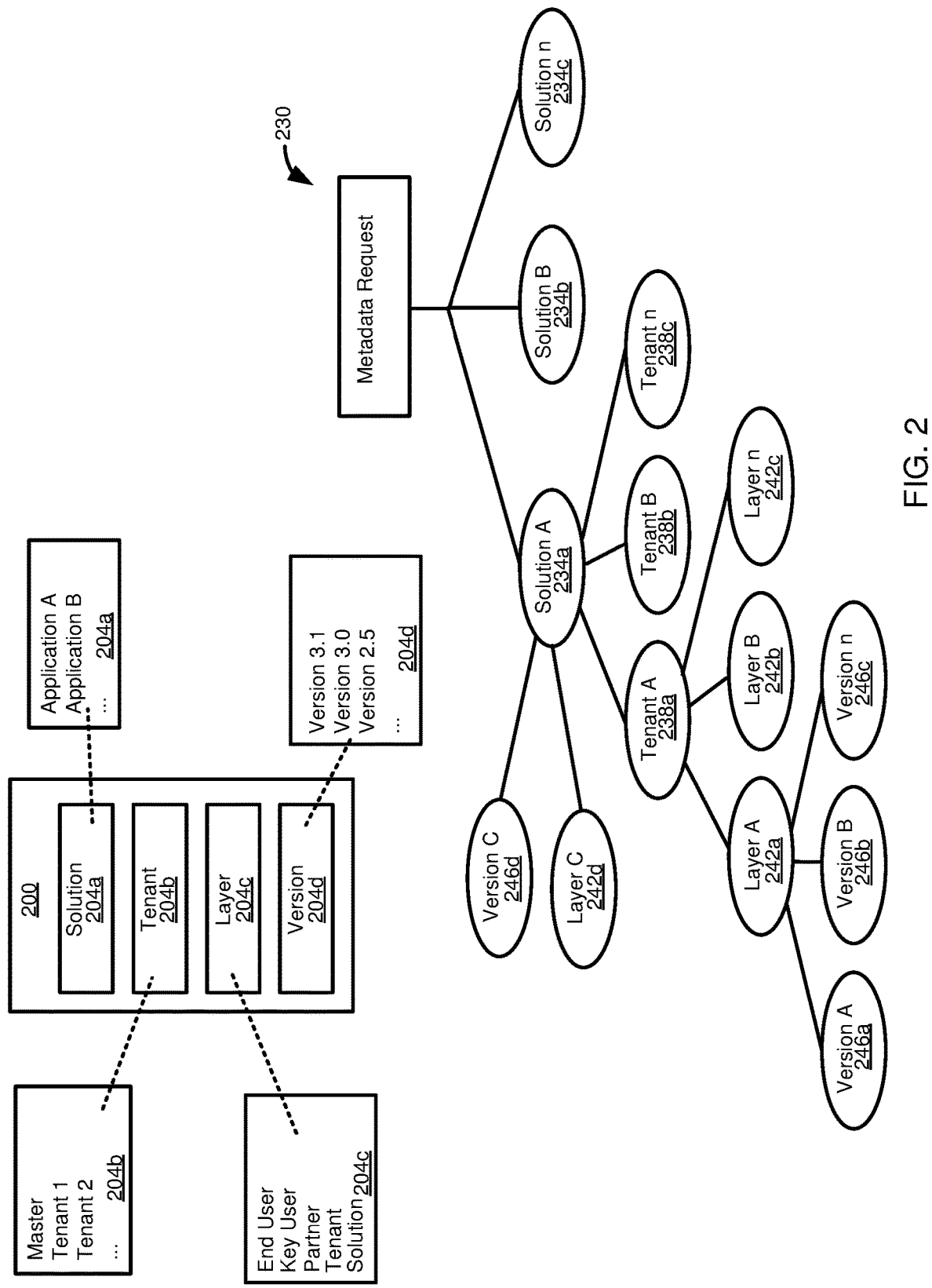
FIG. 2 is a diagram illustrating example metadata for classifying/retrieving metadata artefacts, including how such metadata can have a hierarchical relationship.

Example 3- Example Metadata for Classifying/Distinguishing Between Versions of a Metadata Artefact FIG. 2 illustrates particular criteria 200 that can be used to locate metadata artefacts. That is, metadata artefacts can be given identifiers that can allow particular metadata artefacts to be identified. The identifier can be a composite key, for example a key formed by combining information such as a name of the metadata artefact, a namespace associated with a metadata artefact, a type associated with the metadata artefact, and optionally additional information. Each metadata artefact can be given an identifier to facilitate searching for the identifier. Metadata artefacts are unique, in the sense that they are uniquely identified, but in at least some cases the definition/content of the metadata artefact need not be unique. That is, in theory, two metadata artefacts with different identifiers could have the same content.

A given metadata artefact can be associated with one or more sets of criteria that can be used to group or retrieve the metadata artefact. For instance, a given metadata artefact could be associated with two different products or two different tenants. As a more particular example, metadata artefacts can be assigned to different versions of an application or application component. If a given artefact has not changed between versions, the metadata artefact can be relevant to both versions.

Even if contents of a particular metadata artefact change, it can be useful to associate them with the same metadata artefact identifier. However, different versions of the metadata artefact can be associated with different identifiers so that a particular version can be retrieved if desired. Having a single metadata artefact identifier be associated with multiple possible contents can be facilitated by separating the metadata artefact's identifier from its content. That is, a given identifier A can refer to a particular metadata artefact. Metadata artefact A can have one version having content indicated by content identifier X, while another version of metadata artefact A is associated with content identifier Y. A key can be provided that uniquely identifies combinations of metadata artefact identifiers and content identifiers.

FIG. 2 illustrates that criteria used to locate, or group, metadata artefacts can include a solution 204*a*, a tenant 204*b*, a layer 204*c*, and a version 204*d*. Depending on the implementation, all, a portion, or none of the criteria 200 are required in order to retrieve metadata artefacts. In some cases, it may be useful to require at least a "solution" to be provided.

A solution can refer to a particular software unit, such as an application or application suite. As will be further described, a solution can be composed of one or more modules, which can also be used as a way of grouping/distinguishing between metadata artefacts.

In some cases, different tenants may have different versions of a metadata artefact. For instance, a tenant may themselves create content, modify content, or have access to some content that is different than content available at one or more other tenants. Some metadata artefacts may not be tenant-specific.

Different versions of a metadata artefact can be created based on different entities or users associated with the metadata artefact, which can be referred to as "layer" information. For example, a software vendor may provide a standard version of a metadata artefact. That metadata artefact may then be modified by a tenant, then by a partner, then by a key user of the tenant, and finally by an end user of the tenant. Accordingly, it can be helpful to track what layer is associated with a given metadata artefact so that the correct metadata artefact for a particular layer can be retrieved.

Layering information can also be useful when a final version of a metadata artefact is to be constructed from two or more representations of the metadata artefact. For example, a metadata artefact as provided by a software vendor may be considered as a base layer, and modifications by an end user can be considered a highest layer. A complete definition of the metadata artefact may only be provided in the original definition of the metadata artefact (e.g., as provided by the software vendor), and later representations of the metadata artefact may only include changes (which can be additions, deletions, or alterations) compared with earlier versions. A final definition of a metadata artefact can thus change depending on which layers are determined to be relevant, as well as an order in which the layers are applied. For example, a final metadata artefact resulting from the combination of a set of metadata artefacts that includes a layer from an end user A may be different than a final metadata artefact resulting from the combination of that set but not including the layer from end user A.

FIG. 2 illustrates how selection or search criteria can have a hierarchical relationship. FIG. 2 shows a tree 230 that includes nodes 234a, 234b, 234c representing different solutions. Thus, "solution" is the broadest category for grouping metadata artefacts in this example. Each solution can have one or more tenants, such as nodes 238a, 238b, 238c. In turn, a given tenant 238a-238c can have one or more layers, represented by nodes 242a, 242b, 242c, and in turn each layer can have one or more versions, represented by nodes 246a, 246b, 246c. The other solutions, 234b, 234c, tenants 238b, 238c, and layers 242b, 242c can have child nodes, similar to the structure of solution 234a, although the number of nodes of each type need not be the same for all elements of the tree 230 (including having no nodes of a particular type).

In addition, it is possible to omit at least certain of the criteria 200. As shown, for example, solution 234a has a version 246d that is not associated with a tenant or a layer, and has a layer 242d that is not associated with a tenant.

Some criteria 200, such as the solution 204a and the tenant 204b can represent fixed criteria. That is, the solution 204a and the tenant 204b are applied during search and a match is found or not. A solution 204a can be, for example, a particular product or product component, or a particular version thereof. For example, multiple programs may use a software object representing an employee, but the elements of the object may be different depending on whether the software program is a human resources management program or is an accounting program. Similarly, even for a given solution 204a, there may be a default metadata artefact and versions of the metadata artefact that are different for different tenants.

In some cases, if a metadata artefact is not found that matches search criteria, one or more fallback techniques can be used to determine one or more metadata artefacts to return for a request. For example, if a particular layer is specified, but no corresponding metadata artefact is located, layers higher in the hierarchy (less specific criteria) can be analyzed until a metadata artefact is found (or no more layers remain to be analyzed).

Requests which have multiple matching artefacts can be handled in different ways depending on the specific use case/desired options. For example, in the case of layering, a request may intend to retrieve the most granular, single matching metadata artefact. However, where layer information is additive, a request may intend to retrieve multiple, and perhaps all, relevant metadata artefacts. In this scenario, ordering information can be used to determine which version of a metadata element should "win" in the event of a conflict (e.g., two versions of the same metadata element exist). A final metadata artefact can be constructed from multiple metadata artefacts using such ordering rules.

In a similar manner, versioning for a metadata artefact can also include multiple, ordered options in some implementations, such when a new version of a metadata artefact stores changes to the metadata artefact rather than storing a complete definition of the metadata artefact. A request can intend to retrieve a particular metadata version, as in only the changes for that version, or can intend to retrieve a complete definition of the metadata artefact, which may result in the retrieval of multiple versions of the metadata artefact and determination of a final artefact, where typically changes in later versions of a metadata artefact overwrite conflicting information in earlier versions of the metadata artefact.

Example 4—Example Data Model for Storing Metadata Describing Metadata Artefacts

Figure 3:
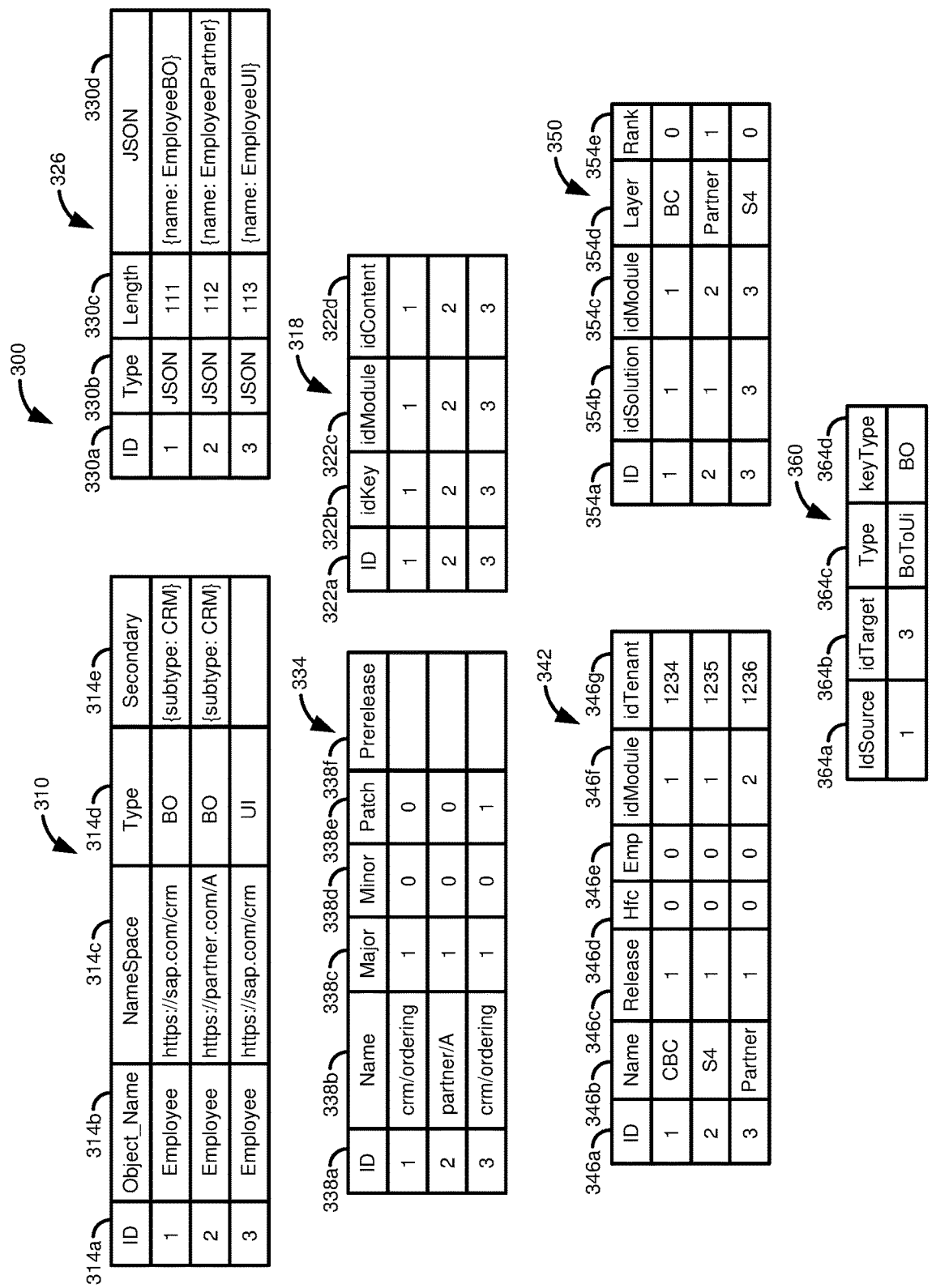
FIG. 3 is an example data model for storing metadata describing metadata artefacts.

FIG. 3 illustrates a schema 300 that can be used to store information about metadata artefacts, which can be used to determine what metadata artefact or metadata artefacts are relevant to a request, and in at least some cases to retrieve content associated with such metadata artefact or metadata artefacts.

A table 310 includes attributes for particular metadata artefacts, including an attribute 314a providing a key representing a particular metadata artefact, an attribute 314b providing a name for a metadata artefact (where the name need not be unique), an attribute 314c identifying a namespace for the metadata artefact, an attribute 314d identifying a type of the metadata artefact (e.g., a particular abstract or composite data type, or a particular classification or use case for the metadata artefact, such as whether the metadata artefact represents a BusinessObject, a type of logical data object used in software available from SAP SE, of Walldorf, Germany, or a user interface), and an attribute 314e identifying a secondary/subtype for the metadata artefact (e.g., a particular subject matter area associated with the metadata artefact, such as "human resources" or "CRM."). One or more of the attributes 314a-314e can be omitted from the table 310, or left unpopulated for any particular record, or additional attributes included if desired, provided that metadata artefacts are identifiable. In addition, in some cases the key attribute 314a can be omitted from the table 310, with the attributes 314b-314e serving as the primary key for the table. Or, both the key attribute 314a and attributes 314b-314e can serve as keys, where the attribute 314a can be a surrogate key.

A table 318 links particular artefacts to particular content, and can also be used to link artefacts to particular software components. In particular, the table 318 includes an attribute 322a that identifiers a particular version of an artefact. An attribute 322b corresponds to the attribute 314a, allowing multiple versions or instances of a metadata artefact to be associated with the same overall metadata artefact. An attribute 322c provides an identifier for a particular software module associated with a data artefact version listed in the table 318, while attribute 322d identifies particular content for a given data artefact version.

The attribute 322d corresponds to a primary key 330a for a table 326. The table 326 is shown as storing content for the artefact in a field 330d, in the form of a JSON listing as shown. When contents are included in the table 326, they can be included in the same format or different formats, including formats such as JSON, CSN, XML, or text. Particularly when the table 326 stores contents in different formats, or otherwise refers to content that may be in different formats, an attribute 330b can indicate a type for the contents. In order to help parse the content, an attribute 330c can include a length (e.g., number of characters, number of bytes, number of lines, etc.) for the content. Rather than directly including the content, in other implementations the schema 300 can provide an identifier for content of an artefact, but the content need not be stored in a table of the schema. For example, the table 326 can include a path (e.g., a URI) where content can be accessed instead of, or in place of, including the actual content in the attribute 330d.

The attribute 322c serves as a primary key attribute 338a for a table 334 providing information, such as release information, for particular software modules. An attribute 338b provides a name for the relevant module, and attributes 338c, 338d, 338e respectively provide information in terms of a major release number, a minor release number, and a patch number. A module being in a prereleased state can be indicated by attribute 338f.

Solutions, which can be particular software applications or suites, can be constructed from multiple modules, such as the modules listed in table 334. A table 342 associates modules with particular solutions. The table 342 includes an attribute 346a providing an identifier for a particular solution and an attribute 346b that lists a name for the solution. The table 342 includes version information for the solution, such as attributes 346c-346e for release, hotfix, and emergency patch information. The table 342 includes an attribute 346f for modules in the solution, corresponding to the attribute 338a, and an attribute 346g that identifies a tenant having that version of the solution installed.

Solutions and their associated modules can have layering information, which, as discussed, can be used to indicate which version of a metadata artefact should be used or treated as having precedence over other versions. In some cases, this information can be stored in a table 350. The table 350 includes an attribute 354a that serves as a key for the table, and can be a surrogate key in some cases. The table 350 includes an attribute 354b corresponding to the attribute 346a, identifying a particular solution, and an attribute 354c corresponding to the attribute 338a, identifying a particular module. An attribute 354d provides an identifier for a particular layer (e.g. specifying a particular source of a change to a metadata artefact) and an attribute 354e specifying a ranking for a given record. The value of attribute 354e indicates precedence for particular layers associated with the same solution and module, such as having lower values have a higher precedence (or, in other cases higher values can signify higher precedence).

Metadata artefacts can be related to other metadata artefacts, where related metadata artefacts can be completely different or can represent different versions of the same metadata artefact. In some cases, it may be desirable to query a metadata repository and not just receive a particular metadata artefact but that metadata artefact and related metadata artefacts. A table 360 can be used to record links between metadata artefacts. The table 360 can include an attribute 364a representing a source metadata artefact and an attribute 346b representing a target metadata artefact, where the values of the attributes 364a, 364b can be values of the attribute 322a, indicating a particular version/instance of a particular metadata artefact.

An attribute 364c can be used to indicate a type of relationship between source and target metadata artefacts. In some implementations, the attribute 364c can be used to indicate the nature of the relationship, such as whether the relationship is a foreign key relationship, an association, a logical pointer, or a parent or child relationship. In other implementations, the attribute 364c can be used to indicate a type of relationship based on characteristics of the source and target metadata artefacts, such as whether two BusinessObjects are being related or if a BusinessObject and a user interface model are being related. An attribute 364d can indicate a type for the source metadata artefact key 364a, such as whether the key is for a BusinessObject or a user interface model. In some cases, the links represented in the table 360 are unidirectional, while in other cases the links can be bidirectional. If the links are unidirectional, bidirectional relationships can be indicated in the table 360 by having two records, where the source and target identifiers are reversed between the two entries.

Example 5—Example Metadata Repository Queries

FIG. 4 illustrates a table 400 that can represent a simplified version of the schema 300 of FIG. 3 and a number of queries 450a-450e, that can be executed to locate relevant metadata artefacts. In the example shown, identifiers are returned, rather than contents of the metadata artefacts. However, if desired, contents can be returned, including by retrieving contents stored in a table as described in connection with the schema 300, or the identifiers can be used to retrieve content from a table or another source (e.g., from a table that associates metadata artefact/content identifiers with a path where the relevant metadata artefact can be accessed).

The table 400 includes an attribute 410a serving as a key (e.g., a surrogate key) for the table, an attribute 410b providing a name of a metadata artefact, an attribute 410c identifying a solution for a given metadata artefact, an attribute 410d identifying a tenant associated with the artefact, an attribute 410e indicating a layer associated with the metadata artefact, and an attribute 410f providing version information for the metadata artefact.

The queries 450a-450e indicate how various selection criteria can be used to locate metadata artefact(s) that are relevant to a particular query, such as a metadata artefact whose information should be provided to a client. Query 450a specifies only the name of a metadata artefact. Since records 1-7 all contain the same metadata artefact name, these identifiers are returned as the query result. In at least some cases, queries having the form of query 450a can be considered too general, as differences between metadata artefact definitions for different solutions may be so great that at least an identifier of a particular solution is needed in order to return a useable result. However, in other cases differences between solution implementations may not be as great, or only a single solution may use a given metadata artefact. If multiple results are returned, the contents of the metadata artefacts may need to be examined to confirm they are acceptable for a desired use.

Query 450b specifies both an identifier (name) of a metadata artefact and a particular solution. In this case, records 5 and 6 can be determined not to be relevant since they are for different solutions, and so records 1-4 and 7 are returned. In some cases, additional rules can be applied to determine, such as limiting, metadata artefacts identified as relevant to a query. For example, if a tenant identifier is not specified as query criteria, metadata artefacts that are associated with particular tenants can be excluded (that is, one or more metadata artefacts can be specified as being "default" or non-tenant specific, such as for record 3), or the layer attribute 410d can be analyzed and results excluded on that basis (for example, where the layer information indicates a particular tenant, a particular user of a particular tenant, etc., is associated with a metadata artefact version).

Query 450c specifies an identifier for a metadata artefact, a solution, and a particular tenant identifier. Using this information only metadata artefacts 1, 2, and 7 are identified as being relevant. While in some cases all of these results are returned, in other cases additional rules can be applied to further limit results, or to provide results in an order. For example, since record 2 has a later version (indicated by attribute 410l) than record 1, either record 2 can be as indicated as relevant but not record 1, or both records can be indicated as relevant but record 1 can be indicated as having primary relevance (e.g., inconsistencies between the two artefacts are resolved in favor of the contents of record 2). In a similar manner, the layer information of attribute 410e can be used to exclude or rank some results. Continuing the same example, record 2 may be ranked as more relevant than record 1 since attribute 410e indicates that a key user created that metadata artefact version, which is more granular/specific that record 1, which is associated with a partner.

Query 450d is similar to query 450c, but also specifies a release identifier. In this case, records 1 and 7 are identified as relevant. Optionally, other criteria, such layer information as discussed in connection with query 450c, can be used to reduce a number of identified metadata artefacts or to order metadata artefacts. Query 450e is similar to query 450d, but also specifies a layer. In this case, it is determined that only record 1 satisfies the search criteria.

Example 6—Example Update of Metadata Repository on Creation of New Version of Software Associated with Metadata Artefacts As discussed in Example 4, information maintained about metadata artefacts can be maintained based on criteria that includes version information, such as a version of a solution or a version a module (which can be a component of a solution). When a new version of a module or solution is created, it can be useful to create entries for metadata artefacts used in that version, even if the metadata artefacts have not changed compared with a prior version. Otherwise, a search for metadata artefacts for a particular version may return no result, or more complicated search logic might need to be implemented to account for later solution/module versions than are reflected in metadata artefact information.

Thus, in some cases, when a new solution or module version is created, a command is sent to a repository to create new entries for metadata artefacts associated with the new version. Maintaining information about metadata artefacts in a schema similar to FIG. 3 can be helpful, as a table can be updated to reflect the new version of the metadata artefact, but information for the new version of the metadata artefact can point to the same content as the old version of the metadata artefact, at least until the metadata artefact is actually modified as compared with a prior version.

Figure 5:
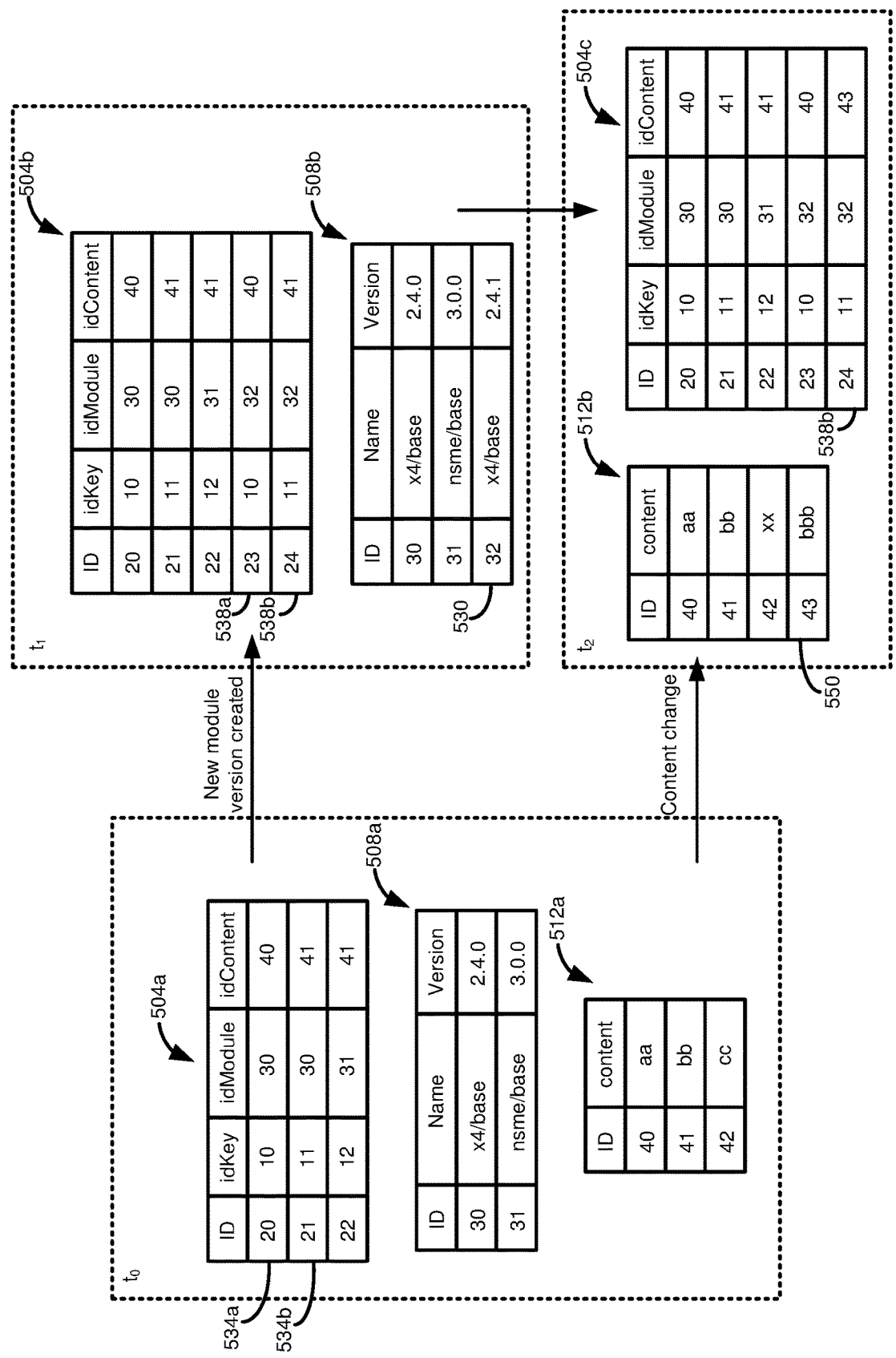
FIG. 5 is a diagram illustrating how a data model for metadata artefacts can be updated when a new version of a solution or module is created.

This update process is illustrated in FIG. 5. Table 504, shown as versions 504a, 504b, 504c, corresponds to table 318 of FIG. 3 and associates particular metadata artefacts with particular content. Table 508, shown as versions 508a, 508b, corresponds to table 334, although the fields of table 508 have been implemented slightly differently than table 334 for ease of presentation. Table 512, shown as versions 512a, 512b, corresponds to table 326, although the fields have been simplified for ease of presentation.

Table versions 504a, 508a, 512a represent a particular state, to, of a metadata artefact repository. At time $t_1$, a new version of a module is added. In response to the new version being added, tables 504a and 508a are updated. In particular, module x/4base is updated from version 2.4.0 to version 2.4.1. So, a row 530 for version 2.4.1 is added to the table 508a to provide the table 508b. In table 504a, rows 534a, 534b are associated with artefacts for module 2.4.0 (having an idModule value of 30). Absent other information, it is assumed that module 2.4.1 will also have these metadata artefacts, and so rows 538a, 538b are added to the table 504a to provide the table 504b. At this point, it is assumed that the metadata artefacts used by the new module version are the same as those used by the prior module version, and so the records in table 504b for the new module version refer to the same idContent value as the rows 542a, 542b for the prior module version.

Content of a metadata artefact associated with module 2.4.1 is modified at $t_2$. The modification corresponds to new content for the metadata artefact, and the content is referred to by updating the value of "idContent" in row 538b of table 504b to provide table 504c. Correspondingly, content for the metadata artefact is included in new row 550 of table 512b.

Example 7—Example Fallback Information

As discussed, some criteria for retrieving metadata artefacts can be hierarchical, and in some cases a hierarchy is used to find a particular metadata artefact. In other cases, multiple metadata artefacts can be returned in response to a query, and hierarchy information can be used both to determine what metadata artefacts are relevant and an ordering of the metadata artefacts, including where the ordering specifies some metadata artefacts whose values will take precedence over others.

In some implementations, hierarchy information is stored in a persistency model used to maintain information about/describe metadata artefacts. On other cases, hierarchy information may be stored elsewhere, such as in a file that is associated with a particular metadata artefact. For example, a metadata artefact may be associated with a file that specifies how layering information is to be processed (e.g., specifying a ranking or ordering of entities responsible for particular metadata, where some entities have a higher priority than other entities) or with a file that includes version information.

Figure 6:
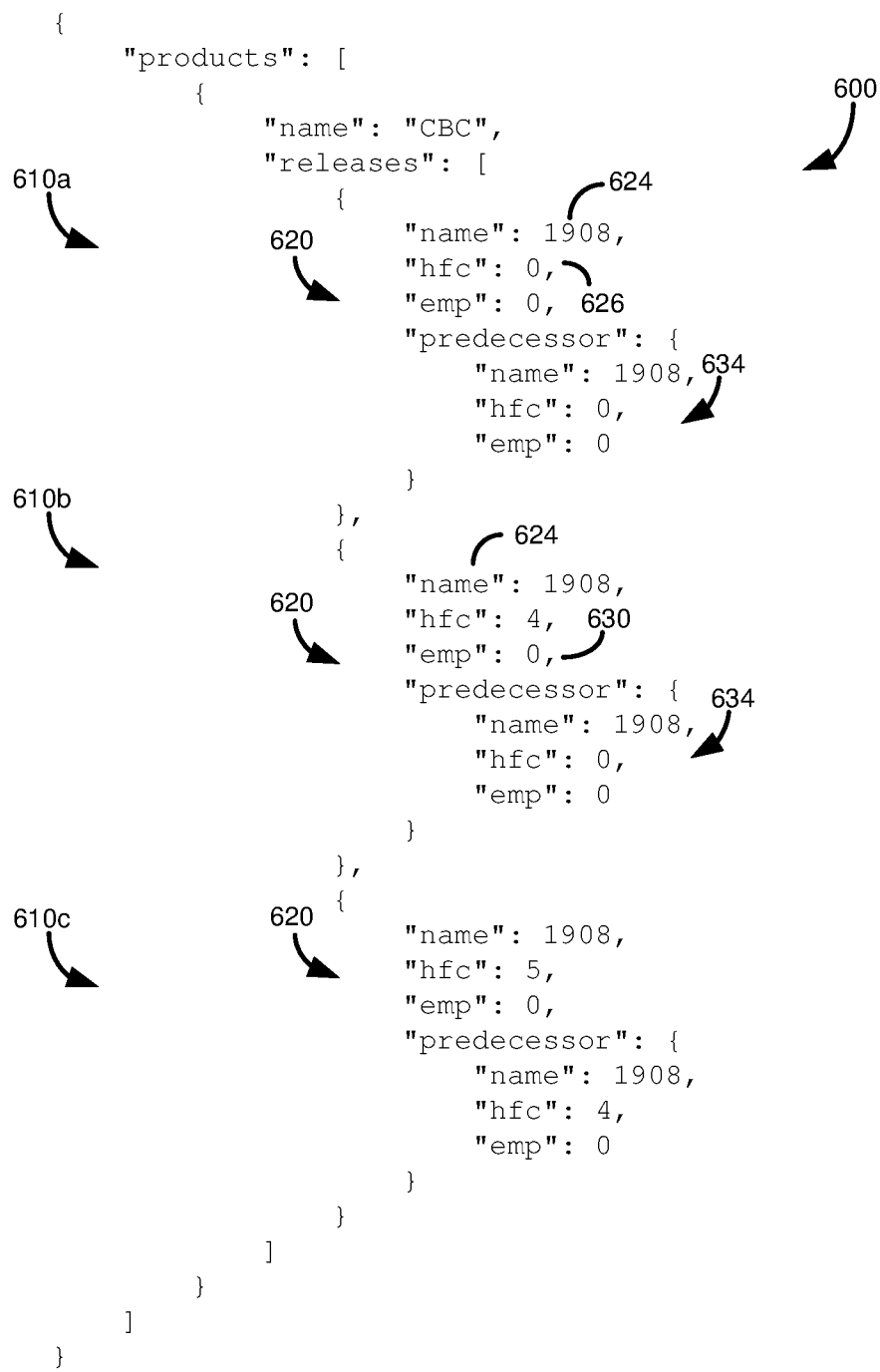
FIG. 6 is an example JSON listing for a metadata artefact showing relationships between versions of the metadata artefact.

Version information can be used in a similar manner as layering information. FIG. 6 illustrates an example listing 600 of a JSON file that specifies version information for a "products" metadata artefact. The listing 600 includes entries 610a-610c for various releases/updates of a solution, or a particular module thereof. Each release of the solution/modules has versioning information 620, in the form of a release name 624, a hotfix identifier 626, and an emergency patch identifier 630.

Each entry 610a-610c also includes predecessor information 634, which can be used to identify the immediately preceding entry. Entry 610a can be determined to be the original entry, as its predecessor information refers back to the entry itself (e.g., the predecessor information 634 is identical to the versioning information 620). Entry 610b's version information indicates that entry 610a is its predecessor, while the version information for entry 610c identifies entry 610b as the predecessor of entry 610c.

Figure 7:
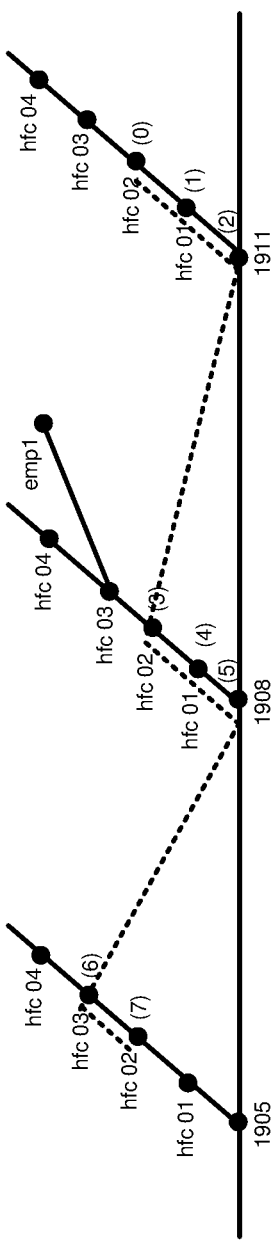
FIG. 7 is diagram illustrating a software development timeline, indicating how a given data artefact may be related to prior versions of a data artefact other than in a chronological development sequence.

Version information, which can be a type of fallback information, can be nonlinear. For example, FIG. 7 illustrates a development history for a software module with three major releases (1905, 1908, 1911), where all of the releases include multiple hot fixes and release 1908 also includes an emergency patch. However, a given metadata artefact may not be changed in all versions, and so determining relevant prior versions of a metadata artefact for a specified version of a metadata artefact may not reconstituted simply by following the development cycle reflected in FIG. 7.

FIG. 7 illustrates a scenario where a metadata artefact associated with hfc 02 of release 1911 is specified. The development history of this metadata artefact is reflected in the numbered nodes, where 0 is the latest version and 7 is the oldest relevant version. The non-linear development history is evidenced in at least two places. From base release 1911, the metadata artefact relates back to hfc02 of release 1908 rather than the last version, hfc04, of release 1908. This can indicate, for example, that a decision was made to create a new release starting from hfc02 of release 1908, and hfc03 and hfc04 of release 1908 may not be appropriate for users running release 1911. Similarly, when backtracking within release 1908, after reaching the base release 1908, the development history indicates that hfc03 of release 1905 is the next oldest relevant version, rather than hfc04 of release 1905. The development history also indicates that there are no relevant metadata artefacts earlier than hfc02 of release 1905, which can indicate, for example, that the metadata artefact was first introduced at hfc02 of release 1905.

Example 8—Example Use of Fallback Information

Figure 8:
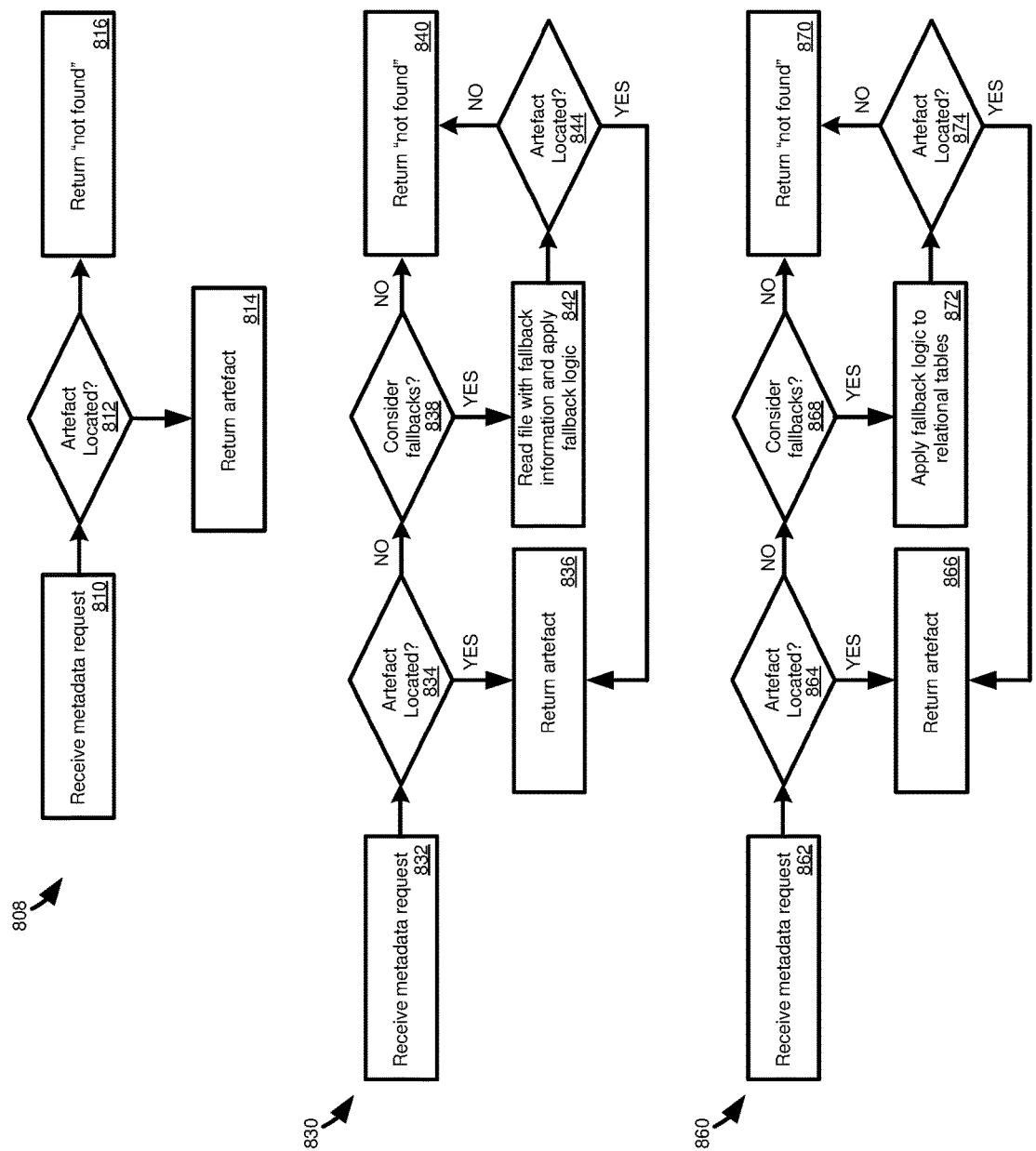
FIGS. 8 and 9 are flowcharts of example methods of locating metadata artefacts, including with or without the use of fallback information.

FIG. 8 illustrates various scenarios for retrieving metadata artefacts from a metadata repository, including depending on whether fallback logic is available for certain search/selection criteria.

A process 808 represents a scenario where fallback logic is not available. At 810, a request for a metadata artefact is received. It is determined at 812 whether one or more metadata artefacts satisfying the criteria have been located. If so, the metadata artefact (or an identifier for the metadata artefact) is returned at 814. If not, an indication that a metadata artefact could not be found is returned at 816.

A process 830 represents a scenario where fallback logic is used, and fallback information is stored in a file. A request for a metadata artefact is received at 832. It is determined at 834 whether any metadata artefacts responsive to the request have been located. If so, the metadata artefacts (or identifiers for the artefacts) are returned at 836. If metadata artefacts were not located, it is determined at 838 whether fallback criteria should be applied to search for responsive metadata artefacts. Determining whether fallback criteria should be applied can include determining whether fallback information is available for a given request (e.g., if fallback information has been defined for a particular metadata artefact or set of criteria for locating metadata artefacts), whether fallback processing has been enabled (including whether a user request specifies whether or not fallback processing should be used, which can include altering a default setting), or whether the query is suitable for fallback processing. For example, in some cases if sufficiently specific criteria is provided, fallback processing will not be applied, while fallback processing is available for more general criteria.

If is determined at 838 that fallback criteria is not to be applied, the process 830 returns an indication at 840 that relevant metadata artefacts were not found. If it is determined at 838 that fallback processing is to be applied, the process 830 locates and reads a file (e.g., a JSON or XML file) with fallback information at 842 and applies fallback logic using information in the file. Applying fallback logic can include parsing version information in the file, such as to locate a most recent version of a metadata artefact that otherwise satisfied search criteria. Or, applying fallback logic can include determining a layer hierarchy (where the layers can correspond to users/entities associated with particular artefact version) and traversing the hierarchy in a specified order (such as most specific—most general) and returning a first artefact in the hierarchy that otherwise satisfies search/selection criteria. In some implementations, multiple type of fallback logic can be applied, such as applying fallback logic to both "version" and "layer" information. Further, depending on the fallback logic, or other conditions associated with the request, multiple metadata artefacts for a given set of fallback logic can be provided.

As an example of how the process 830 can used. Consider a request for a metadata artefact that specifies a particular solution and tenant, but does not specify a layer or version. Fallback information for the metadata artefact can be read at 842 to determine what metadata artefact or artefacts should be selected based on layer or version information associated with the metadata artefact. Or, fallback logic can be applied if the request specifies a particular solution, tenant, and one or both of a version or a layer, but no metadata artefact exists for the specified version or layer. In that case, the fallback logic can determine whether, for example, earlier or later versions should be returned in response to the metadata request, or whether a metadata artefact from a (typically) more general layer should be returned than a layer specified in the request (e.g., returning a metadata artefact associated with a tenant layer if a metadata artefact cannot be located for an end user specified in the request.)

At 844, it is determined whether any metadata artefacts were located using the fallback information and logic. If so, they are returned in response to the request at 836. If not, an indication can be provided at 846 that no matching metadata artefacts were located.

A process 860 can be generally similar to the process 830. However, rather than reading a file for fallback information at 842, at 872, fallback information is determined from relational database tables, such as the table 350 of FIG. 3. Of course, combinations of approaches can be used, such as having some fallback information stored in a file, and having other fallback information stored in relational database tables. When fallback information is stored in one or more tables, information in a fallback file, such as in the listing 600 of FIG. 6, can be processed and stored in the one or more database tables.

Figure 9:
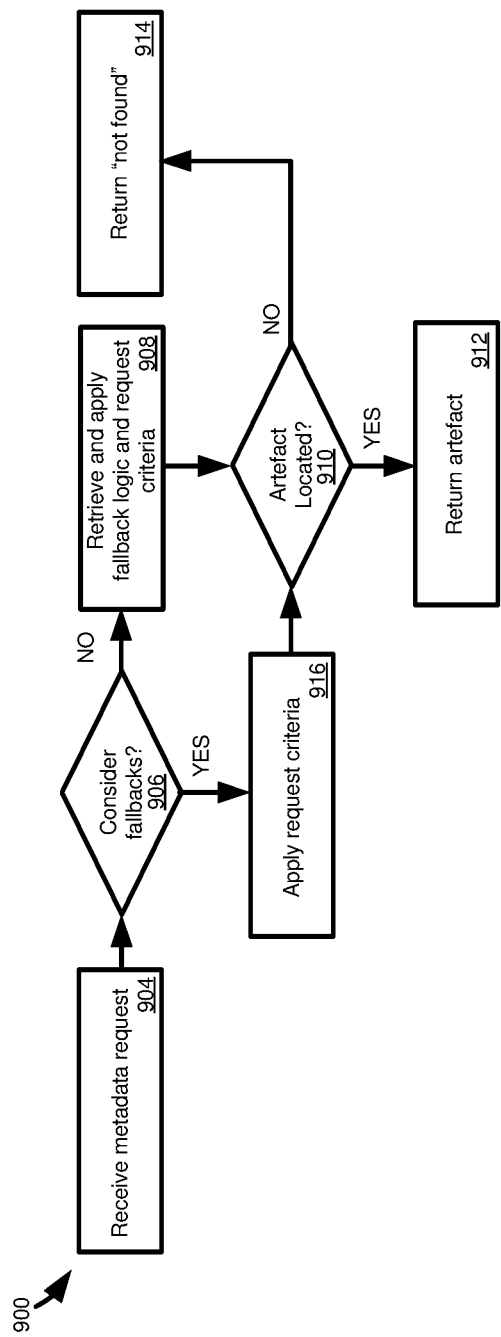

While in some cases fallback information is considered if primary search criteria are not satisfied, in other cases fallback information is used to determine metadata artefacts to return in response to the request in addition to any metadata artefacts satisfying search criteria. FIG. 9 illustrates a process 900 that can return artefacts directly matching search/selection criteria and metadata artefacts determined using fallback information. A metadata request is received at 904. At 906 it is determined whether fallback information should be considered in processing the request. If not, the process 900 proceeds to 908 where request criteria are applied. It is determined at 910 whether any responsive metadata artefacts were identified. If so, the metadata artefacts (or identifiers for the metadata artefacts) are returned at 912. If not, an indication can be provided at 914 that no responsive metadata artefacts were located.

If it is determined at 906 that fallback logic should be used, the logic can be determined and applied at 916 (e.g., by reading a file or by examining fallback information stored in a relational database), and the process can continue to 910. If relevant metadata artefacts are identified, they are returned at 912, while if no artefacts are located a corresponding indication can be returned in response to the request at 914.

The process 900 can be combined with other process, such as the process 830 or the process 860 of FIG. 8. That is, rather than automatically applying the fallback logic to augment results from applying request criteria, fallback logic is only applied if metadata artefacts are not located in response to the request criteria.

Example 9—Example Implementations

Figures 10A, 10B:
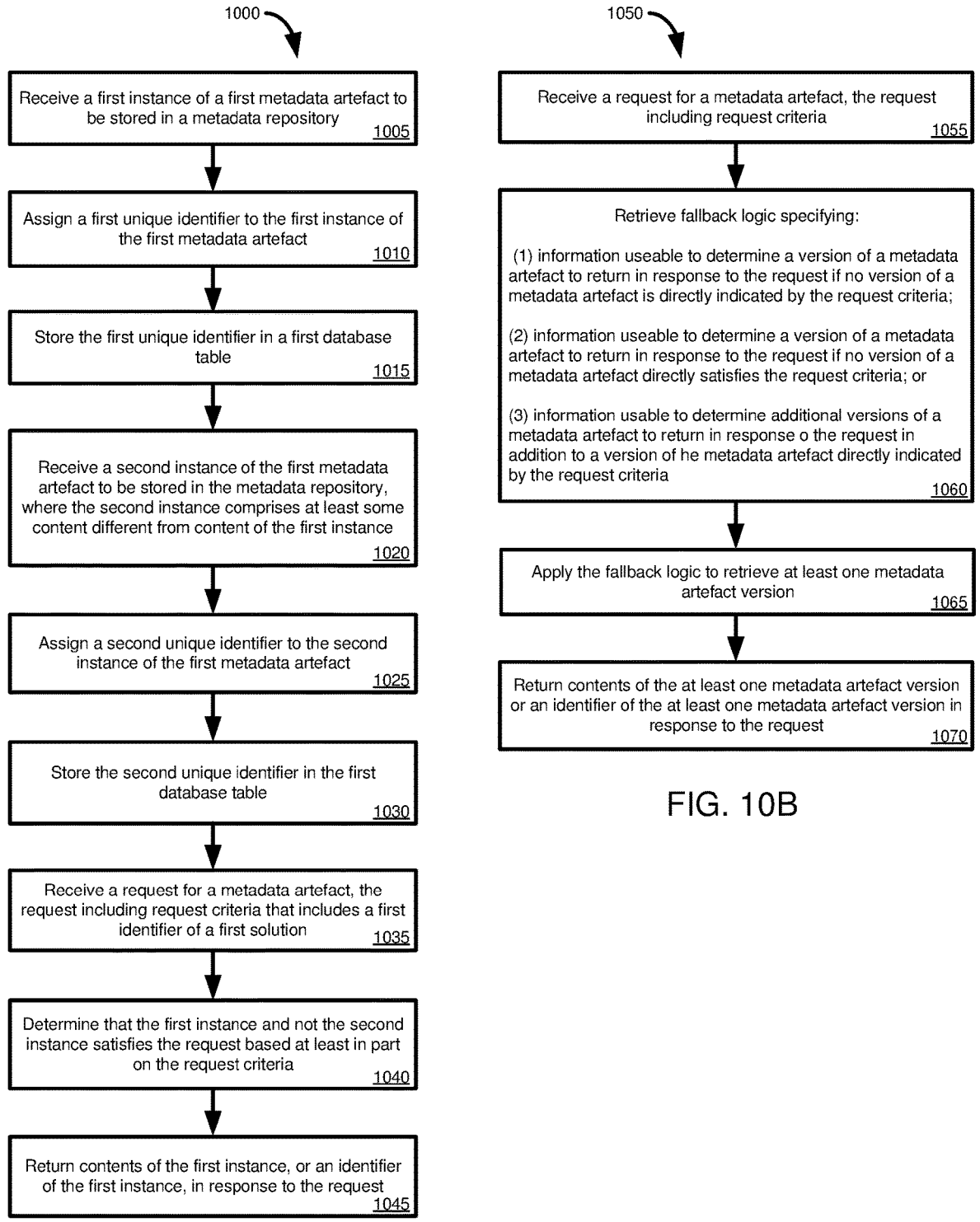
FIGS. 10A and 10B are flowcharts illustrating various embodiments of disclosed innovations.

FIG. 10A provides a flowchart of a method 1000 for retrieving one or more metadata artefacts from a metadata repository. The method 1000 can be implemented in the computing environment of FIG. 1, and can use a schema, such as the schema 300 of FIG. 3.

At 1005, a first instance of a first metadata artefact to be stored in a metadata repository is received. A first unique identifier is assigned to the first instance of the first metadata artefact at 1010. The first unique identifier is stored in a first database table at 1015.

At 1020, a second instance of the first metadata artefact to be stored in the metadata repository is received. The second instance of the first metadata artefact includes at least some content that differs from content of the first instance of the first metadata artefact. A second unique identifier is assigned to the second instance of the first metadata artefact at 1025. The second unique identifier is stored in the first database table at 1030.

At 1035, a request for a metadata artefact is received, where the request includes request criteria that include a first identifier of a first solution. It is determined at 1040, based at least in part on the request criteria, that the first instance of the first metadata artefact and not the second instance of the first metadata artefact satisfies the request. Contents of the first metadata artefact or an identifier of the first instance of the first metadata artefact is returned in response to the request at 1045.

FIG. 10B provides a flowchart of a method 1050 for retrieving one or more metadata objects from a metadata repository, where fallback logic can be applied. The method 1000 can be implemented in the computing environment of FIG. 1, and can include one or more of the processes 830, 860 of FIG. 8 or the process 900 of FIG. 9.

At 1055, a request for a metadata artefact is received. The request includes request criteria. Fallback logic is retrieved at 1060, where the fallback logic specifies: (1) information useable to determine a version of a metadata artefact to return in response to the request if no version of a metadata artefact is directly indicated by the request criteria; (2) information useable to determine a version of a metadata artefact to return in response to the request if no version of a metadata artefact directly satisfies the request criteria; or (3) information useable to determine additional versions of a metadata artefact to return in response to a request in addition to a version of the metadata artefact directly indicted by the request criteria. The fallback logic is applied at 1065 to retrieve at least one metadata artefact version. At 1070, contents of the at least one metadata artefact, or an identifier of the at least one metadata artefact version, are returned in response to the request.

Example 10—Computing Systems

Figure 11:
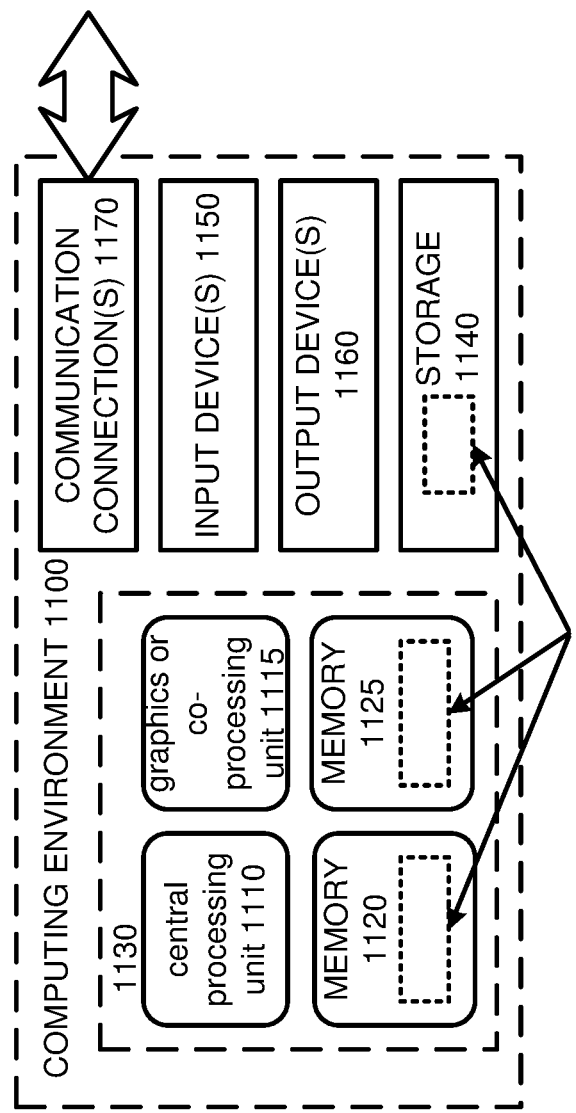
FIG. 11 is a diagram of an example computing system in which some described embodiments can be implemented.

FIG. 11 depicts a generalized example of a suitable computing system 1100 in which the described innovations may be implemented. The computing system 1100 is not intended to suggest any limitation as to scope of use or functionality of the present disclosure, as the innovations may be implemented in diverse general-purpose or special-purpose computing systems.

With reference to FIG. 11, the computing system 1100 includes one or more processing units 1110, 1115 and memory 1120, 1125. In FIG. 11, this basic configuration 1130 is included within a dashed line. The processing units 1110, 1115 execute computer-executable instructions, such as for implementing components of the environment 100 of FIG. 1, including as described in Examples 1-9. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 11 shows a central processing unit 1110 as well as a graphics processing unit or co-processing unit 1115. The tangible memory 1120, 1125 may be volatile memory (e.g., registers, cache, RAM), non-volatile memory (e.g., ROM, EEPROM, flash memory, etc.), or some combination of the two, accessible by the processing unit(s) 1110, 1115. The memory 1120, 1125 stores software 1180 implementing one or more innovations described herein, in the form of computer-executable instructions suitable for execution by the processing unit(s) 1110, 1115.

A computing system 1100 may have additional features. For example, the computing system 1100 includes storage 1140, one or more input devices 1150, one or more output devices 1160, and one or more communication connections 1170. An interconnection mechanism (not shown) such as a bus, controller, or network interconnects the components of the computing system 1100. Typically, operating system software (not shown) provides an operating environment for other software executing in the computing system 1100, and coordinates activities of the components of the computing system 1100.

The tangible storage 1140 may be removable or non-removable, and includes magnetic disks, magnetic tapes or cassettes, CD-ROMs, DVDs, or any other medium which can be used to store information in a non-transitory way, and which can be accessed within the computing system 1100. The storage 1140 stores instructions for the software 1180 implementing one or more innovations described herein.

The input device(s) 1150 may be a touch input device such as a keyboard, mouse, pen, or trackball, a voice input device, a scanning device, or another device that provides input to the computing system 1100. The output device(s) 1160 may be a display, printer, speaker, CD-writer, or another device that provides output from the computing system 1100.

The communication connection(s) 1170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 21—Cloud Computing Environment

Figure 12:
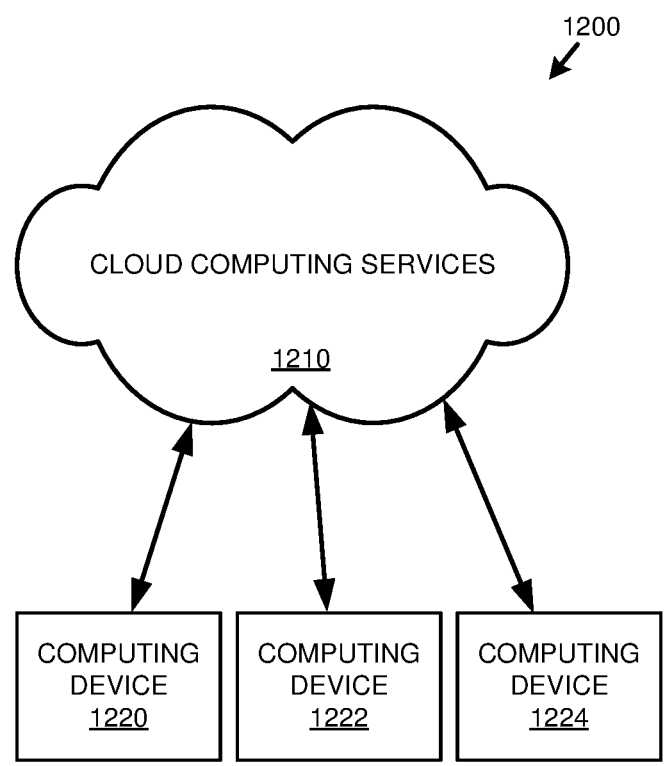
FIG. 12 is an example cloud computing environment that can be used in conjunction with the technologies described herein.

FIG. 12 depicts an example cloud computing environment 1200 in which the described technologies can be implemented. The cloud computing environment 1200 comprises cloud computing services 1210. The cloud computing services 1210 can comprise various types of cloud computing resources, such as computer servers, data storage repositories, networking resources, etc. The cloud computing services 1210 can be centrally located (e.g., provided by a data center of a business or organization) or distributed (e.g., provided by various computing resources located at different locations, such as different data centers and/or located in different cities or countries).

The cloud computing services 1210 are utilized by various types of computing devices (e.g., client computing devices), such as computing devices 1220, 1222, and 1224. For example, the computing devices (e.g., 1220, 1222, and 1224) can be computers (e.g., desktop or laptop computers), mobile devices (e.g., tablet computers or smart phones), or other types of computing devices. For example, the computing devices (e.g., 1220, 1222, and 1224) can utilize the cloud computing services 1210 to perform computing operators (e.g., data processing, data storage, and the like).

Example 22—Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 11, computer-readable storage media include memory 1120 and 1125, and storage 1140. The term computer-readable storage media does not include signals and carrier waves. In addition, the term computer-readable storage media does not include communication connections (e.g., 1170).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, C#, Java, Perl, JavaScript, Python, Ruby, ABAP, SQL, XCode, GO, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
   at least one hardware processor;
   at least one memory coupled to the at least one hardware processor; and
   one or more computer readable storage media storing computer-executable instructions that, when executed, cause the computing system to perform operations comprising:
      receiving a first instance of a first metadata artefact to be stored in a metadata repository;
      assigning a first unique identifier to the first instance of the first metadata artefact;
      storing the first unique identifier in a first database table;
      receiving a second instance of the first metadata artefact to be stored in the metadata repository, wherein the second instance of the first metadata artefact comprises at least some content that differs from content of the first instance of the first metadata artefact;
      assigning a second unique identifier to the second instance of the first metadata artefact;
      storing the second unique identifier in the first database table;
      receiving a request for a metadata artefact, the request comprising request criteria comprising a first identifier of a first solution, wherein the first identifier of the first solution is different than the first unique identifier and the second unique identifier, but is useable to access the first instance of the first metadata artefact or the second instance of the first metadata artefact and wherein the first identifier of the first solution serves to group a plurality of metadata artefacts associated with the first solution;
      determining that first instance of the first metadata artefact and not the second instance of the first metadata artefact satisfies the request based at least in part on the request criteria; and
      returning contents of the first instance of the first metadata artefact or an identifier of the first instance of the first metadata artefact in response to the request.

2. The computing system of claim 1, the operations further comprising:
   storing content of the first instance of the first metadata artefact in the metadata repository, wherein returning contents of the first instance of the first metadata artefact or an identifier of the first instance of the first metadata artefact comprises returning at least a portion of content of the first instance of the first metadata artefact in response to the request.

3. The computing system of claim 2, wherein the content is stored in a relational database table.

4. The computing system of claim 3, wherein the content is in JSON, CSN, or XML format.

5. The computing system of claim 1, wherein the first instance of the first metadata artefact is associated with one or both of a layer identifier or a version identifier and the second instance of the first metadata artefact is associated with one or both of a layer identifier or a version identifier different than the layer identifier or version identifier of the first metadata instance.

6. The computing system of claim 1, wherein the first instance of the first metadata artefact and the second instance of the first metadata artefact are associated with different solutions.

7. The computing system of claim 1, wherein the first instance of the first metadata artefact and the second instance of the first metadata artefact are associated with different tenants.

8. The computing system of claim 1, wherein the first instance of the first metadata artefact is not tenant specific, and the second instance of the first metadata artefact is specific to one tenant of a multitenant database system.

9. The computing system of claim 1, wherein determining that the first instance of the first metadata artefact and not the second instance of the first metadata artefact is responsive to the request comprises applying fallback logic, the fallback logic specifying (1) rules for determining a version of a metadata artefact to return in response to the request if no version of a metadata artefact is directly indicated by request criteria; or (2) rules for determining a version of a metadata artefact to return in response to the request if no instance of a metadata artefact directly satisfies request criteria.

10. The computing system of claim 9, wherein the fallback logic is stored in a file associated with the first unique identifier.

11. The computing system of claim 9, wherein the fallback logic is stored in one or more relational database tables and is retrievable at least using the first unique identifier.

12. The computing system of claim 9, wherein the fallback information comprises a hierarchy of layers.

13. The computing system of claim 9, wherein the fallback information comprises ordered versioning information.

14. The computing system of claim 1, wherein the first instance of the first metadata artefact is associated with a first content identifier and the second instance of the first metadata artefact is associated with a second content identifier, wherein the first content identifier is different than the second content identifier.

15. The computing system of claim 1, wherein the first instance of the first metadata artefact is associated with a first content identifier and the second instance of the first metadata artefact is associated with a second content identifier, wherein the first content identifier is the same as the second content identifier.

16. The computing system of claim 1, the operations further comprising:
   receiving a change to content of the second instance of the first metadata artefact; and
   assigning a content identifier to the second instance of the first metadata artefact that is different than the content identifier assigned to the first instance of the first metadata artefact.

17. The computing system of claim 1, wherein the first instance of the first metadata artefact and the second instance of the first metadata artefact are associated with a common identifier.

18. The computing system of claim 17, wherein fallback information is specified by the common identifier.

19. One or more computer-readable storage media comprising:
   computer-executable instructions that, when executed by a computing system comprising at least one hardware processor and at least one memory coupled to the at least one hardware processor, cause the computing system to receive a request for a metadata artefact, the request comprising request criteria comprising a solution identifier;
   computer-executable instructions that, when executed by the computing system, cause the computing system to retrieve fallback logic specifying (1) information useable to determine a version of a metadata artefact to return in response to the request if no version of a metadata artefact is directly indicated by request criteria; (2) information useable to determine a version of a metadata artefact to return in response to the request if no version of a metadata artefact directly satisfies request criteria; or (3) information useable to determine additional versions of a metadata artefact to return in response to a request in addition to a version of the metadata artefact directly indicated by the request criteria;
   computer-executable instructions that, when executed by the computing system, cause the computing system to apply the fallback logic to retrieve at least one metadata artefact version having an identifier, wherein the identifier is different than the solution identifier and wherein the solution identifier serves to group a plurality of metadata artefacts associated with a solution having the solution identifier; and
   computer-executable instructions that, when executed by the computing system, cause the computing system to return contents of the at least one metadata artefact version or an identifier of the at least one metadata artefact version in response to the request.

20. A method, implemented in a computing system comprising at least one hardware processor and at least one memory coupled to the at least one hardware processor, the method comprising:
   receiving a first instance of a first metadata artefact to be stored in a metadata repository;
   assigning a first unique identifier to the first instance of the first metadata artefact;
   storing the first unique identifier in a first database table;
   receiving a second instance of the first metadata artefact to be stored in the metadata repository, wherein the second instance of the first metadata artefact comprises at least some content that differs from content of the first instance of the first metadata artefact;
   assigning a second unique identifier to the second instance of the first metadata artefact;
   storing the second unique identifier in the first database table;
   receiving a request for a metadata artefact, the request comprising request criteria comprising a first identifier of a first solution, wherein the first identifier of the first solution is different than the first unique identifier and the second unique identifier, but is useable to access the first instance of the first metadata artefact or the second instance of the first metadata artefact and wherein the first identifier of the first solution serves to group a plurality of metadata artefacts associated with the first solution;
   determining that the first instance of the first metadata artefact and not the second instance of the first metadata artefact satisfies the request based at least in part on the request criteria; and
   returning contents of the first instance of the first metadata artefact or an identifier of the first instance of the first metadata artefact in response to the request.

* * * * *